(12) United States Patent
Chang

(10) Patent No.: US 6,591,803 B2
(45) Date of Patent: Jul. 15, 2003

(54) SAFETY SWITCH FOR A VEHICLE STARTING SYSTEM

(75) Inventor: Chen-Apin Chang, Chung-Ho (TW)

(73) Assignee: Wintecronics Co., Ltd. (TW)

( * ) Notice: Subject to any disclaimer, the term of this patent is extended or adjusted under 35 U.S.C. 154(b) by 54 days.

(21) Appl. No.: 10/007,238

(22) Filed: Nov. 9, 2001

(65) Prior Publication Data

US 2003/0047155 A1 Mar. 13, 2003

(30) Foreign Application Priority Data

Sep. 7, 2001 (TW) ...................... 90215437 U

(51) Int. Cl.[7] ............................................. F02N 11/08
(52) U.S. Cl. ................. 123/179.2; 180/286; 307/10.6
(58) Field of Search ......................... 123/179.2, 179.3, 123/179.4; 307/10.6; 180/286

(56) References Cited

U.S. PATENT DOCUMENTS

| | | | |
|---|---|---|---|
| 4,674,454 A | * | 6/1987 | Phairr ....................... 123/179.2 |
| 5,024,186 A | * | 6/1991 | Long et al. ............... 123/179.2 |
| 5,129,376 A | * | 7/1992 | Parmley ................... 123/179.2 |
| 5,600,299 A | * | 2/1997 | Tompkins .................... 340/429 |
| 6,467,448 B2 | * | 10/2002 | Wisnia et al. ............ 123/179.2 |

* cited by examiner

*Primary Examiner*—Thomas N. Moulis
(74) *Attorney, Agent, or Firm*—Marger Johnson & McCollom, PC

(57) ABSTRACT

A safety switch is coupled to a control line of a vehicle starting system, and includes a first electrical connector that terminates a second branch of the control line, a first resistor that connects a first branch of the control line to a first voltage source, a switch element having a first end connected to a second voltage source, and a second end terminated by a second electrical connector that mates with the first electrical connector, and a second resistor connected in parallel with the switch element. The switch element makes or breaks electrical connection between the first and second ends according to a detected position state of an engine hood of the vehicle. The starting system is enabled so as to permit remote-controlled activation of the vehicle only when a voltage drop, the magnitude of which is between the voltage outputs of the first and second voltage sources, is present at the control line.

2 Claims, 2 Drawing Sheets

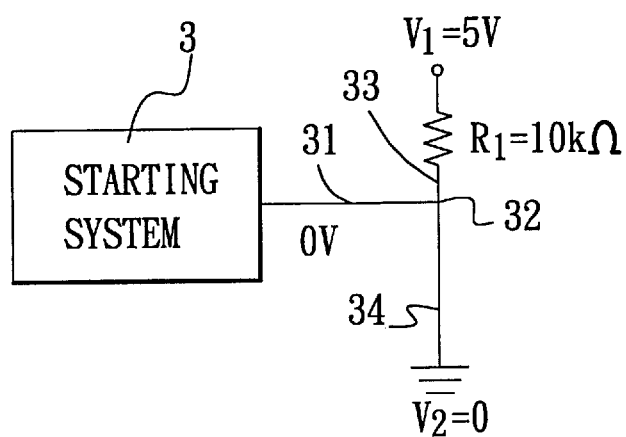
F I G. 3
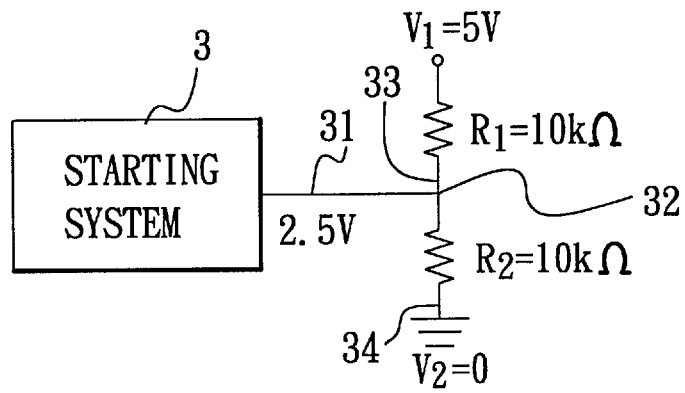
F I G. 4
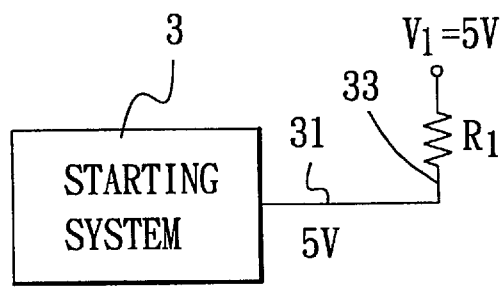
F I G. 5

SAFETY SWITCH FOR A VEHICLE STARTING SYSTEM

CROSS-REFERENCE TO RELATED APPLICATION

This application claims priority of Taiwan patent application no. 090215437, filed on Sep. 7, 2001.

BACKGROUND OF THE INVENTION

1. Field of the Invention

The invention relates to a safety switch for a vehicle starting system, more particularly to a safety switch for ensuring that remote-controlled activation of a vehicle is possible only when an engine hood is in a closed state.

2. Description of the Related Art

When starting a vehicle, the driver of the vehicle will, through the action of a starting system, activate an ignition system for driving operation of an engine system and a linkage system of the vehicle. Aside from using a key to start a vehicle, it is also known heretofore to use a remote controller for remote-controlled activation of the vehicle.

However, untimely activation of the remote controller while the vehicle is being repaired will expose a mechanic to danger. With reference to FIG. 1, because an engine hood of the vehicle is normally in an opened state when repairing the latter, a safety switch 2 can be coupled to a control line 11 of the starting system 1 such that remote-controlled activation of the vehicle is enabled only when the opened state of the engine hood is detected by the safety switch 2. As shown in FIG. 1, one end portion 111 of the control line 11 is connected to the starting system 1. The other end 112 of the control line 11 is formed with first and second branches 12, 13. The first branch 12 is connected to a +5V voltage source. The second branch 13 is terminated by a first electrical connector 14. The safety switch 2 has a first end 21 terminated by a second electrical connector 22 that complements the first electrical connector 14. As such, electrical connection between the starting system 1 and the safety switch 2 is established when the first and second electrical connectors 14, 22 are inter-engaged. The safety switch 2 further has a grounded second end 23. The safety switch 2 conducts, i.e. electrical connection between the first and second ends 21, 23 is made, such that a ground voltage is provided to the control line 11 via the safety switch 2 when the engine hood is in an opened state. The safety switch 2 is cut-off, i.e. electrical connection between the first and second ends 21, 23 is broken, such that the +5 voltage is provided to the control line 11 when the engine hood is in a closed state. As such, when the starting system 1 receives a remote control signal for remote-controlled activation of the vehicle from a remote controller (not shown), the starting system 11 will first detect the voltage signal present at the control line 11. If the +5 voltage is present at the control line 11, the starting system 1 will be enabled to permit remote-controlled starting of the engine system of the vehicle. Otherwise, if the ground voltage is present at the control line 11, the starting system 1 will be inhibited from permitting the remote-controlled starting of the engine system of the vehicle. Therefore, activation of the vehicle by remote control can be avoided when the engine hood is in the opened state so as to result in a safer environment for mechanics.

However, it is noted that the connection between the first and second electrical connectors 14, 22 is likely to loosen over a period of time. When the first and second electrical connectors 14, 22 are improperly connected, the safety switch 2 will be unable to provide the ground voltage to the control line 11 in the event that the engine hood of the vehicle is in the opened state. Under such a condition, the +5 voltage will always be present at the control line 11, thereby resulting in the possibility of undesired starting of the engine system by remote control.

In addition, when the safety switch 2 breaks down and is always cut-off, no indication is provided as to the need to replace the safety switch 2.

SUMMARY OF THE INVENTION

Therefore, the main object of the present invention is to provide a safety switch for ensuring that remote-controlled activation of a vehicle starting system is possible only when an engine hood is in a closed state.

Another object of the present invention is to provide a safety switch that can indicate the need to replace a broken switch element thereof.

According to the present invention, a safety switch is adapted to be coupled to a control line of a starting system of a vehicle. The starting system is operable so as to detect a voltage signal present at the control line upon receipt of a remote control signal for remote-controlled activation of the vehicle from a remote controller. The voltage signal indicates position state of an engine hood of the vehicle. The safety switch is adapted to inhibit the starting system so as to prevent the remote-controlled activation of the vehicle when the position state of the engine hood corresponds to an opened state, and is adapted to enable the starting system so as to permit the remote-controlled activation of the vehicle when the position state of the engine hood corresponds to a closed state. The control line has an end portion formed with first and second branches. The safety switch comprises:

a first electrical connector adapted to terminate the second branch of the control line;

a first resistor adapted to connect the first branch of the control line to a first voltage source that has a first voltage output;

a switch element having a first end adapted to be connected to a second voltage source that has a second voltage output lower than the first voltage output, and an opposite second end, the switch element being adapted to detect the position state of the engine hood, and making electrical connection between the first and second ends when the position state of the engine hood corresponds to the opened state, and breaking the electrical connection between the first and second ends when the position state of the engine hood corresponds to the closed state;

a second electrical connector for terminating the second end of the switch element, the second electrical connector complementing the first electrical connector so as to be adapted to connect the switch element to the second branch when the second electrical connector engages the first electrical connector; and a second resistor connected in parallel with the switch element between the first and second ends.

When the first and second electrical connectors are properly connected, and the position state of the engine hood corresponds to the opened state, the voltage signal at the control line corresponds to the second voltage output in view of the connection between the second branch and the second voltage source via the first and second electrical connectors and the switch element, thereby inhibiting the starting system so as to prevent the remote-controlled activation of the vehicle.

When the first and second electrical connectors are properly connected, and the position state of the engine hood corresponds to the closed state, the voltage signal at the control line corresponds to a voltage drop that is less than the first voltage output and greater than the second voltage output in view of the connection between the second branch and the second voltage source via the first and second electrical connectors and the second resistor, thereby enabling the starting system so as to permit the remote-controlled activation of the vehicle.

When the first and second electrical connectors are improperly connected such that the switch element is disconnected from the second branch, the voltage signal at the control line corresponds to the first voltage output, thereby inhibiting the starting system so as to prevent the remote-controlled activation of the vehicle.

Preferably, a light emitting diode is connected in series with the second resistor between the first and second ends of the switch element, and can indicate whether or not the switch element is broken and needs to be replaced.

BRIEF DESCRIPTION OF THE DRAWINGS

Other features and advantages of the present invention will become apparent in the following detailed description of the preferred embodiment with reference to the accompanying drawings, of which:

FIG. 3 is an equivalent circuit diagram of the preferred embodiment when first and second electrical connectors are properly connected, and the position state of an engine hood corresponds to an opened state;

FIG. 4 is an equivalent circuit diagram of the preferred embodiment when the first and second electrical connectors are properly connected, and the position state of the engine hood corresponds to a closed state; and FIG. 5 is an equivalent circuit diagram of the preferred embodiment when the first and second electrical connectors are improperly connected.

DETAILED DESCRIPTION OF THE PREFERRED EMBODIMENT

Figure 1:
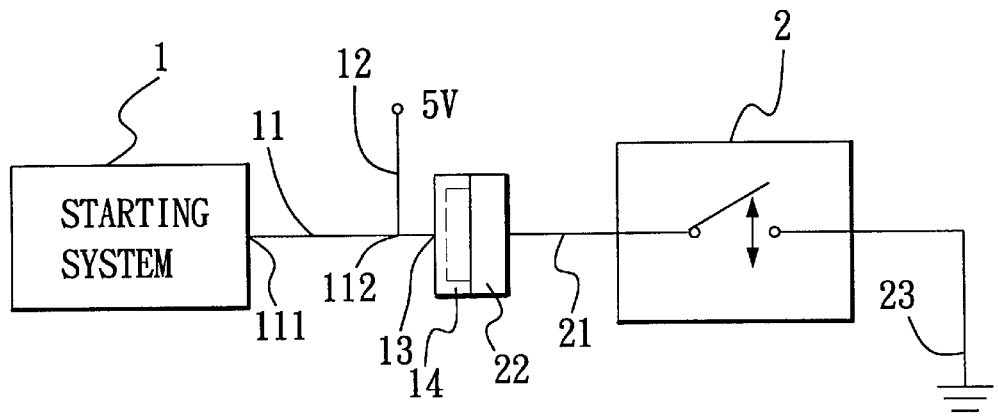
FIG. 1 is a schematic electrical circuit diagram illustrating a conventional safety switch for a starting system of a vehicle.
Figure 2:
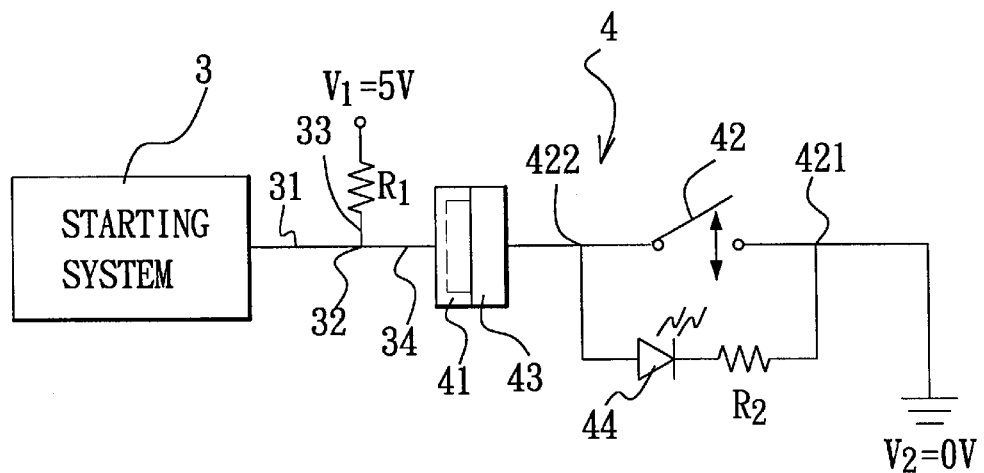
FIG. 2 is a schematic electrical circuit diagram illustrating the preferred embodiment of a safety switch for a starting system of a vehicle according to the present invention.

Referring to FIG. 2, the preferred embodiment of a safety switch 4 according to the present invention is shown to be adapted to be coupled to a control line 31 of a starting system 3 of a vehicle. The starting system 3 is operable so as to detect a voltage signal present at the control line 31 upon receipt of a remote control signal for remote-controlled activation of the vehicle from a remote controller (not shown). The voltage signal indicates the position state of an engine hood (not shown) of the vehicle. The safety switch 4 is adapted to inhibit the starting system 3 so as to prevent the remote-controlled activation of the vehicle when the position state of the engine hood corresponds to an opened state, and is adapted to enable the starting system 3 so as to permit the remote-controlled activation of the vehicle when the position state of the engine hood corresponds to a closed state. The control line 31 has an end portion 32 that is formed with first and second branches 33, 34. The first branch 33 is to be connected to a first voltage source that has a first voltage output (V1). In the preferred embodiment, the first voltage output (V1) is equal to +5 volts. The safety switch 4 comprises a first electrical connector 41, a first resistor (R1), a switch element 42, a second electrical connector 43, a second resistor (R2), and a light emitting diode 44.

The first electrical connector 41 is adapted to terminate the second branch 34 of the control line 31.

The first resistor (R1) is adapted to connect the first branch 33 of the control line 31 to the first voltage source. In this embodiment, the first resistor (R1) has a resistance of 10 KΩ.

The switch element 42 has a first end 421 adapted to be connected to a second voltage source that has a second voltage output (V2) lower than the first voltage output (V1). In the preferred embodiment, the second voltage output (V2) is equal to 0 volt, thereby grounding the first end 421 of the switch element 42. The switch element 42 further has a second end 422 terminated by the second electrical connector 43. The second electrical connector 43 complements the first electrical connector 41 such that the switch element 42 is connected to the second branch 34 when the first and second electrical connectors 41, 43 are inter-engaged. The switch element 42 is adapted to detect the position state of the engine hood in a conventional manner, and is in a conducting state to make electrical connection between the first and second ends 421, 422 when the position state of the engine hood corresponds to the opened state, and is in a cut-off state to break the electrical connection between the first and second ends 421, 422 when the position state of the engine hood corresponds to the closed state.

The second resistor (R2) is connected in parallel with the switch element 42 between the first and second ends 421, 422. In this embodiment, the resistance of the second resistor (R2) is the same as that of the first resistor (R1) and is equal to 10 KΩ.

The light emitting diode 44 is connected in series with the second resistor (R2) between the first and second ends 421, 422 of the switch element 42. As is known in the art, the light emitting diode 44 is capable of emitting light when electric current flows therethrough.

As shown in FIG. 2, when the first and second electrical connectors 41, 43 are properly connected, connection between the switch element 42 and the second branch 34 can be ensured. When the engine hood is in the opened state, the switch element 42 conducts to make the electrical connection between the first and second ends 421, 422. Under such conditions, the equivalent circuit diagram of the safety switch 4 is shown in FIG. 3. In combination with FIG. 2, the end portion 32 of the control line 31 is pulled to the second voltage output (V2) in view of the connection between the second branch 34 and the second voltage source via the first and second electrical connectors 41, 43 and the switch element 42. The starting system 3 is inhibited so as to prevent the remote-controlled activation of the vehicle at this time.

Referring back to FIG. 2, when the first and second electrical connectors 41, 43 are properly connected, and the engine hood is in the closed state, the switch element 42 is cut-off to break the electrical connection between the first and second ends 421, 422. Under such conditions, the equivalent circuit diagram of the safety switch 4 is shown in FIG. 4. In combination with FIG. 2, electric current from the first voltage source flows through the first resistor (R1), the first and second electrical connectors 41, 43, and the series combination of the light emitting diode 44 and the second resistor (R2). At this time, a voltage drop (V3) that is less than the first voltage output (V1) and greater than the second voltage output (V2) is present at the control line 31. The magnitude of the voltage drop (V3) can be calculated using the following Equation I:

$$V3=(V1-V2)R2/(R1+R2)+V2 \qquad \text{Equation I}$$

Because the resistances of the first and second resistors (R1, R2) are equal, and because the second voltage source provides a 0-volt output, the voltage drop (V3) is equal to one-half of the first voltage output (V1) or 2.5 volts. Due to the presence of the voltage drop (V3) at the control line 31, the starting system 3 can be enabled so as to permit the remote-controlled activation of the vehicle at this time.

In the event that the switch element 42 breaks down and is always cut-off, electric current flows through the light emitting diode 44 such that the latter emits light even when the engine hood is in the opened state. By monitoring the status of the light emitting diode 44, the mechanic is thus given an indication as to when replacement of the switch element 42 should be conducted.

When the first and second electrical connectors 41, 43 are improperly connected such that the switch element 42 is disconnected from the second branch 34, the equivalent circuit diagram of the safety switch 4 is shown in FIG. 5. In combination with FIG. 2, the control line 31 is pulled to the first voltage output (V1) via the first resistor (R1) The starting system 3 can thus be inhibited so as to prevent the remote-controlled activation of the vehicle at this time.

Therefore, when the starting system 3 receives a remote control signal for remote-controlled activation of the vehicle from the remote controller, the starting system 3 first detects the voltage signal present at the control line 31. When either of the first or the second voltage outputs (V1, V2) is present at the control line 31, the starting system 3 is inhibited so as to prevent the remote-controlled activation of the vehicle. Whether or not a loose connection is present between the first and second electrical connectors 41, 43 can also be detected as well. It is only when the voltage drop (V3) is present at the control line 31 that the starting system 3 will be enabled so as to permit the remote-controlled activation of the vehicle. Moreover, because electric current flows through the light emitting diode 44 when the switch element 42 is in the cut-off state, when the light emitting diode 44 emits light while the engine hood is in the opened state, the mechanic will be given an indication that the switch element 42 has broken down and should be replaced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A safety switch adapted to be coupled to a control line of a starting system of a vehicle, the starting system being operable so as to detect a voltage signal present at the control line upon receipt of a remote control signal for remote-controlled activation of the vehicle from a remote controller, the voltage signal indicating position state of an engine hood of the vehicle, said safety switch being adapted to inhibit the starting system so as to prevent the remote-controlled activation of the vehicle when the position state of the engine hood corresponds to an opened state, and being adapted to enable the starting system so as to permit the remote-controlled activation of the vehicle when the position state of the engine hood corresponds to a closed state, the control line having an end portion formed with first and second branches, said safety switch comprising:

a first electrical connector adapted to terminate the second branch of the control line;

a first resistor adapted to connect the first branch of the control line to a first voltage source that has a first voltage output;

a switch element having a first end adapted to be connected to a second voltage source that has a second voltage output lower than the first voltage output, and an opposite second end, said switch element being adapted to detect the position state of the engine hood, and making electrical connection between said first and second ends when the position state of the engine hood corresponds to the opened state, and breaking the electrical connection between said first and second ends when the position state of the engine hood corresponds to the closed state;

a second electrical connector for terminating said second end of said switch element, said second electrical connector complementing said first electrical connector so as to be adapted to connect said switch element to the second branch when said second electrical connector engages said first electrical connector; and a second resistor connected in parallel with said switch element between said first and second ends;

wherein, when said first and second electrical connectors are properly connected, and the position state of the engine hood corresponds to the opened state, the voltage signal at the control line corresponds to the second voltage output in view of the connection between the second branch and the second voltage source via said first and second electrical connectors and said switch element, thereby inhibiting the starting system so as to prevent the remote-controlled activation of the vehicle;

wherein, when said first and second electrical connectors are properly connected, and the position state of the engine hood corresponds to the closed state, the voltage signal at the control line corresponds to a voltage drop that is less than the first voltage output and greater than the second voltage output in view of the connection between the second branch and the second voltage source via said first and second electrical connectors and said second resistor, thereby enabling the starting system so as to permit the remote-controlled activation of the vehicle; and wherein, when said first and second electrical connectors are improperly connected such that said switch element is disconnected from the second branch, the voltage signal at the control line corresponds to the first voltage output, thereby inhibiting the starting system so as to prevent the remote-controlled activation of the vehicle.

2. The safety switch as claimed in claim 1, further comprising a light emitting diode connected in series with said second resistor between said first and second ends of said switch element.

* * * * *